United States Patent
Nakayama et al.

(10) Patent No.: US 12,225,922 B2
(45) Date of Patent: Feb. 18, 2025

(54) FOOD STRUCTURE-STRENGTHENING AGENT, FOOD MATERIAL CONTAINING STRUCTURE-STRENGTHENING AGENT, FOOD PREPARED BY HARDENING FOOD MATERIAL, AND METHOD FOR IMPROVING TASTE AND PHYSICAL PROPERTIES OF FOOD

(71) Applicant: MIZKAN HOLDINGS CO., LTD., Aichi (JP)

(72) Inventors: Takuya Nakayama, Aichi (JP); Hideaki Taguchi, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 549 days.

(21) Appl. No.: 17/481,505

(22) Filed: Sep. 22, 2021

(65) Prior Publication Data

US 2022/0000163 A1  Jan. 6, 2022

Related U.S. Application Data

(63) Continuation of application No. PCT/JP2020/012517, filed on Mar. 19, 2020.

(30) Foreign Application Priority Data

Mar. 22, 2019 (JP) .................. 2019-055344

(51) Int. Cl.
| | | |
|---|---|---|
| *A23L 29/262* | (2016.01) | |
| *A23G 9/34* | (2006.01) | |
| *A23G 9/44* | (2006.01) | |
| *A23L 5/30* | (2016.01) | |
| *A23L 33/22* | (2016.01) | |

(52) U.S. Cl.
CPC ............... *A23L 33/22* (2016.08); *A23G 9/34* (2013.01); *A23G 9/44* (2013.01); *A23L 5/30* (2016.08); *A23L 29/262* (2016.08)

(58) Field of Classification Search
CPC ......... A23G 9/34; A23L 29/262; A23L 33/24; A23L 33/22
See application file for complete search history.

(56) References Cited

FOREIGN PATENT DOCUMENTS

| | | |
|---|---|---|
| JP | H04-218357 A | 8/1992 |
| JP | H07-143856 A | 6/1995 |
| JP | 2013-074883 A | 4/2013 |
| JP | 2013-074884 A | 4/2013 |
| JP | 2013-236585 A | 11/2013 |
| JP | 2014-132912 A | 7/2014 |
| JP | 2015-073501 A | 4/2015 |
| JP | 2017-131217 A | 8/2017 |

OTHER PUBLICATIONS

International Search Report issued in International Application No. PCT/JP2020/012517, dated Jun. 23, 2020 (3 pages).

*Primary Examiner* — Jenna A Watts
(74) *Attorney, Agent, or Firm* — Osha Bergman Watanabe & Burton LLP

(57) ABSTRACT

A structural strengthening agent for food products, which agent moderates both cold stimuli and persistence of sweetness and oiliness in the mouth during eating of food products such as cold desserts is provided. The structural strengthening agent for food products includes a water-insoluble long-chain cellulose having a diameter of 3.5 μm or less and an aspect ratio of 2.0 or more, and a water-insoluble short-chain cellulose having a diameter of 5.0 μm or more and having an aspect ratio of 32.5 or less. The water-insoluble long-chain cellulose and the water-insoluble short-chain cellulose are contained in a mass ratio of 40:60 to 4:96.

19 Claims, 9 Drawing Sheets

FOOD STRUCTURE-STRENGTHENING AGENT, FOOD MATERIAL CONTAINING STRUCTURE-STRENGTHENING AGENT, FOOD PREPARED BY HARDENING FOOD MATERIAL, AND METHOD FOR IMPROVING TASTE AND PHYSICAL PROPERTIES OF FOOD

TECHNICAL FIELD

One or more embodiments of the present invention relate to a structural strengthening agent for a food product, a food material containing the structural strengthening agent, a food product made of the hardened food material, and a method of improving the taste and physical properties of the food product.

BACKGROUND

A surprisingly considerable number of people dislike frozen desserts such as ice cream. The reasons include disgust for cold stimuli (although not hyperesthesia) at the time of eating irrespective of the season or ambient temperature during eating, or disgust that sweetness and/or oiliness remains in the mouth if those cold desserts melt too quickly in the mouth.

PTLs 1 and 2 each disclose a technique of sufficiently delaying the start of melting of soft-serve ice cream without affecting other properties such as viscosity, texture, and flavor. PTL 3 discloses a technique of improving the shape retainability of a cold dessert without affecting other properties such as viscosity, texture, and flavor. PTL 4 discloses a technique related to an improver for a sweet aftertaste of a sweetener and a method of improving a sweet aftertaste.

The soft-serve ice cream is originally a product for counter selling in a soft state without undergoing hardening. While the methods or techniques disclosed in PTLs 1 and 2 involves addition of a plant-derived microfibrous cellulose to the soft-serve ice cream to delay the melting down thereof, they do not enhance the hardness of the soft-serve ice cream. Thus, the resulting soft-serve ice cream still remains soft, and cold stimuli derived from heat exchange accompanied by melting of the soft-serve ice cream in the mouth and persistence of sweetness and oiliness are not reduced. PTL 3 provides states that hard ice creams and frozen desserts having hardness, other than soft-serve ice creams, containing plant-derived microfibrous cellulose delay melting down thereof, without affecting other properties such as viscosity, texture, and flavor. However, this measure does not enhance the hardness of hard ice creams and frozen desserts and affect melting properties thereof in the mouth. Thus, the measure does not reduce cold stimuli derived from heat exchange accompanied by melting of hard ice creams or frozen desserts in the mouth and persistence of sweetness and oiliness. In contrast. PTL 4 discloses that the method involves addition of a fermentation-derived cellulose to a cold dessert to improve the sweet aftertaste of the sweetener. The sweetener in PTL 4 indicates a high-intensity sweetener, and the effect on a standard sweetener such as sucrose or oils and fats is not mentioned.

As described above, no technique for moderation of the main reasons i.e., cold stimuli and persistence of sweetness and oiliness in the mouth for people who dislike ice creams, has been yet developed.

PATENT LITERATURE

PTL 1: Japanese Patent Application Laid-Open No. 2014-132912

PTL 2: Japanese Patent Application Laid-Open No. 2013-074883

PTL 3: Japanese Patent Application Laid-Open No. 2013-074884

PTL 4: Japanese Patent Application Laid-Open No. 2015-073501

SUMMARY

One or more embodiments of the present invention provide a structural strengthening agent for a food product, a food material containing the structural strengthening agent, a food product made of the hardened food material, and a method of improving a taste and physical properties of the food product which enable moderation of cold stimuli and persistence of sweetness and oiliness in the mouth, when food products such as cold desserts are eaten.

The present inventors, who have conducted extensive research in consideration of such circumstances, have paid attention to advantageous effects exerted on the taste and texture of the food product by strengthening the structure thereof, which are not found in the known techniques. Based on the findings, the present inventors have further conducted research to complete the following invention.

One or more embodiments of the present invention provide Aspects [1] to [15] below.

[1] A structural strengthening agent for a food product, comprising a water-insoluble long-chain cellulose having a diameter of 3.5 μm or less and an aspect ratio of 2.0 or more; and a water-insoluble short-chain cellulose having a diameter of 5.0 μm or more and having an aspect ratio of 32.5 or less, the water-insoluble long-chain cellulose and the water-insoluble short-chain cellulose being contained in a mass ratio of 40:60 to 4:96.

[2] The structural strengthening agent for a food product according to Aspect [1], wherein the total content of the long-chain water-insoluble cellulose and the water-insoluble short-chain cellulose in the food product is 4.5 mass % or more and 53 mass % or less.

[3] The structural strengthening agent for a food product according to Aspect [1] or [2], wherein the water-insoluble long-chain cellulose is at least one of a pulp cellulose and a fermentation-derived cellulose.

[4] The structural strengthening agent for a food product according to any one of Aspects [1] to [3], wherein the water-insoluble short-chain cellulose is at least one of a pulp cellulose and a dried plant powder.

[5] The structural strengthening agent for a food product according to any one of Aspects [1] to [4], wherein the food product is hardened from a melted state.

[6] The structural strengthening agent for a food product according to Aspect [5], wherein the food product hardened from a melted state is a cold dessert that contains water and is refrigerated at 0° C. or less.

[7] The structural strengthening agent for a food product according to Aspect [6], wherein the cold dessert containing water and refrigerated at 0° C. or less is at least one selected from the group consisting of hard ice creams, soft-serve ice creams, and frozen desserts.

[8] A food material, comprising the structural strengthening agent for a food product according to any one of Aspects [1] to [7].

[9] The food material according to Aspect [8], further comprising water.

[10] The food material according to Aspect [9], wherein the content of water in the food material is 2 mass % or more and 98 mass % or less.

[11] A food product, wherein the food material according to any one of Aspects [8] to [10] is hardened under a hardening condition for the food material.

[12] A method of producing a food product, comprising mixing the structural strengthening agent for a food product according to any one of Aspects [1] to [7] with a food material; and hardening the mixture.

[13] The method of producing a food product according to Aspect [12], wherein the food material contains water.

[14] A method of reinforcing structural strength in a food product, comprising mixing the structural strengthening agent for a food product according to any one of Aspects [1] to [7] with a food material, and hardening the mixture.

[15] A method of improving a taste and physical properties of a food product, the method comprising mixing the structural strengthening agent for a food product according to any one of Aspects [1] to [7] with a food material, and hardening the mixture.

One or more embodiments of the present invention can provide a structural strengthening agent for a food product, a food material containing the structural strengthening agent, a food product made of the hardened food material, and a method of improving the taste and physical properties of the food product which enable moderation of cold stimuli and persistence of sweetness and oiliness in the mouth, which have been mentioned when food products such as cold desserts are eaten.

DETAILED DESCRIPTION

Figure 1:
FIG. 1 is a sectional photograph of a freeze-dried product of the ice cream prepared in Comparative Sample 1 in Example 1, the photograph being taken from surface observation (100×) with a tabletop scanning electron microscope.

One or more embodiments of the present invention relate to a structural strengthening agent for a food product comprising a water-insoluble long-chain cellulose having a diameter of 3.5 μm or less and an aspect ratio of 2.0 or more; and a water-insoluble short-chain cellulose having a diameter of 5.0 μm or more and having an aspect ratio of 32.5 or less, the water-insoluble long-chain cellulose and the water-insoluble short-chain cellulose being contained in a mass ratio of 40:60 to 4:96. One or more embodiments of the present invention also relate to a food material containing the structural strengthening agent, a food product made of the hardened food material, and a method of improving the taste and physical properties of the food product.

In the present disclosure, the water-insoluble long-chain cellulose indicates those which are insoluble to water (solubility to 1 L of water at 20° C. and 0.10 MPa is 0.1 g or less) and have a diameter of 3.5 μm or less and an aspect ratio of 2.0 or more. Specific examples thereof include celluloses which satisfy such properties and compositions containing such celluloses. Plant-derived pulp celluloses and fermentation-derived celluloses produced by microorganisms are preferred from the viewpoint of edibility and ease of handling. In particular, preferred fermentation-derived celluloses are ones produced by microorganisms such as Acetobacteraceaes, specifically ones derived from nata de coco from the viewpoint of production efficiency. Alternatively, a composition comprising the water-insoluble long-chain cellulose is also available. Specific examples thereof include a composition containing a fermentation-derived cellulose produced by a microorganism as an ingredient, where the fermentation-derived cellulose may be contained as it is or may be in a fine or disintegrated form prepared in a solution with a homogenizer to have the properties within the ranges specified above. It is preferred that celluloses prepared through chemical partial depolymerization of celluloses, such as crystal celluloses, be not contained to ensure the advantageous effects of one or more embodiments of the present invention. The term "long-chain" cellulose is conveniently used to refer to the celluloses having a diameter of 3.5 μm or less and an aspect ratio of 2.0 or more, and the cellulose is not always a single chain or a branch-free chain.

In one or more embodiments of the present invention, the water-insoluble short-chain cellulose cannot be dissolved in water and have a diameter of 5.0 μm or more and an aspect ratio of 32.5 or less. Specific examples thereof include celluloses which satisfy such properties and compositions containing such celluloses. Plant-derived pulp celluloses are preferred from the viewpoint of edibility and ease of handling. The water-insoluble short-chain cellulose may be in the form of a composition comprising the water-insoluble short-chain cellulose above. Specific examples thereof include a dried plant powder as it is or a fine form thereof crushed in a solution with a mill to have the above properties within the ranges specified above. It is preferred that celluloses (such as crystal celluloses) prepared through chemical partial depolymerization of celluloses be not contained to ensure the advantageous effects of one or more embodiments of the present invention. The term "short-chain" cellulose is conventionally used to refer to the celluloses having a diameter of 5.0 μm or less and an aspect ratio of 32.5 or less, and the cellulose is not always a single chain or a branch-free chain.

In the present disclosure, the diameter of the cellulose indicates the average diameter of cellulose chains, which can be determined by observation of cellulose fibers with a standard tabletop scanning electron microscope (tabletop SEM, such as "Miniscope TM3000" available from Hitachi, Ltd."). At least 30 cellulose fibers are selected at random, and the diameter in μm of each fiber is measured. The average, maximum, and minimum of the 30 measured diameters are determined.

In the present disclosure, the aspect ratio of the cellulose indicates the ratio of the long side to the short side in a rectangular image, and can be determined by measuring the long side and the short side of the cellulose fiber in observation with a standard tabletop scanning electron microscope (tabletop SEM, such as "Miniscope TM3000" available from Hitachi, Ltd.). At least 30 cellulose fibers are selected at random, and each of them is measured for the aspect ratio (ratio of the length in μm of the long side to the diameter in μm of the short side of a rectangular image. The average, maximum, and minimum of the 30 measured values are determined. The average or the maximum (preferably the maximum) is defined as the diameter of the water-insoluble long-chain cellulose, and the average or the minimum (preferably the minimum) is defined as the diameter of the insoluble short-chain cellulose. The minimum is defined as the aspect ratio of the water-insoluble long-chain cellulose, and the maximum is defined as the aspect ratio of the water-insoluble short-chain cellulose.

Specifically, the upper limit of the diameter of the water-insoluble long-chain cellulose may be 3.5 μm. The upper limit may be 3.0 μm, 2.5 μm, or 2.0 μm to ensure the advantageous effects. The diameter of the water-insoluble cellulose may have any lower limit. It is preferred that the lower limit of the diameter be usually 0.1 μm.

The lower limit of the diameter of the water-insoluble short-chain cellulose may be 5.0 μm. The lower limit may be 7.5 μm, 10 μm, or 12.5 μm to ensure the advantageous effects. The diameter may have any upper limit. A preferred upper limit is usually 50 μm.

Furthermore, the minimum of the aspect ratio of the water-insoluble long-chain cellulose may be 2.0 or more. The minimum may be 2.2 or more, 2.4 or more, or 2.6 or more to ensure the advantageous effects. The maximum of the aspect ratio of the water-insoluble short-chain cellulose may be 32.5 or less. The maximum may be 25 or less, 20 or less, or 15 or less to ensure the advantageous effects.

Although the food product according to one or more embodiments of the present invention can be any food product, it indicates a food product hardened and shaped from a melted or softened state (e.g., a liquid or pasty state, which is referred to as food material, with respect to the advantageous effects of the prevent invention). The food material is hardened by a method involving a change in temperature, physical changes such as evaporation of water, or a chemical change through light irradiation, polymerization, cross-linking, or hydration. The degree of hardening varies depending on the food product, and includes a variety of states from a very hard state to a pasty state. Specific examples thereof include solid fats, konjac gel, jellies, bavarois, dessert puddings, yokan, uiro, whipped cream, mousses, frozen food products, hard ice creams, soft-serve ice creams, and frozen desserts. Furthermore, preferred are frozen food products, hard ice creams, soft-serve ice creams, and frozen desserts containing water and refrigerated at 0° C. or less to ensure the advantageous effects of one or more embodiments of the present invention. In particular, hard ice creams and frozen desserts are preferred from the viewpoint of an eating mode at low temperatures and hardness suitable for eating.

The food material may contain water in any amount. A preferred lower limit is usually 2 mass %. Especially, the water content may be 5 mass %, 10 mass %, or 15 mass % to ensure the advantageous effects of one or more embodiments of the present invention. The upper limit thereof may be 98 mass %. Especially, the water content may be 95 mass %, 92.5 mass %, or 90 mass % to ensure the advantageous effects of one or more embodiments of the present invention.

The structural strengthening agent for a food product according to one or more embodiments of the present invention may contain the water-insoluble long-chain cellulose having a diameter of 3.5 μm or less and an aspect ratio of 2.0 or more and the water-insoluble short-chain cellulose having a diameter of 5.0 μm or more and an aspect ratio of 32.5 or less in a mass ratio (in dryness) of usually 40:60 to 4:96. Specifically, the lower limit of the mass percentage of the water-insoluble short-chain cellulose to the total of the water-insoluble long-chain cellulose and the water-insoluble short-chain cellulose is usually 60%, preferably 67%, more preferably 79%. The upper limit of the mass percentage is usually 96%, preferably 93%, more preferably 87%.

The water-insoluble long-chain cellulose and the water-insoluble short-chain cellulose in the structural strengthening agent for a food product according to one or more embodiments of the present invention or the composition containing these celluloses may be added to the food material through any process. In one or more embodiments, these celluloses may be preliminarily mixed in a mixing ratio within a specific range before addition to the food material. In alternative embodiments, these celluloses may be separately added to the food material such that the mixing ratio falls within a specific range. These can be added to the food material at any timing. The timing for addition may be appropriately adjusted to prepare a food material having desired properties and quality.

The water-insoluble long-chain cellulose, the water-insoluble short-chain cellulose, and the composition containing these cellulose can be in any form. These may be in the form of a powder (excluding the case where the celluloses or the composition does not ensure the advantageous effects of one or more embodiments of the present invention due to aggregation and integration), a dispersion (in this case, any dispersant can be used as long as the celluloses or the composition is satisfactorily dispersed for use), or a solid (that is, the celluloses or the composition can be appropriately dispersed in the food material to ensure the advantageous effects of one or more embodiments of the present invention).

The structural strengthening agent for a food product may be in the form of a dispersion, a powder, or a solid as described above both in the case that these celluloses are preliminarily mixed in a mixing ratio within a specific range before addition to the food material and that these celluloses are separately added such that the mixing ratio falls within a specific range. Any structural strengthening agent may be appropriately selected depending on the properties of the celluloses and the composition containing these celluloses, provided that the celluloses retain the original states to ensure the advantageous effects of one or more embodiments of the present invention (i.e., are not aggregated, integrated, or precipitated).

The water-insoluble long-chain cellulose and the water-insoluble short-chain cellulose, which are effective structural strengthening agents for a food product according to one or more embodiments of the present invention, can be added in any amount to the food material, and the amount may be appropriately adjusted to ensure the effect. Usually, the lower limit of the total content thereof in the entire food material may be 4.5 mass %. Especially, the lower limit may be 7.5 mass %, or 11.5 mass % to ensure the advantageous effects of one or more embodiments of the present invention. The upper limit thereof may be 53 mass %, or 33 mass % to ensure the advantageous effects of one or more embodiments of the present invention. The water-insoluble long-chain cellulose is commercially available at present in a wet form such as a low-content aqueous suspension. Use of a higher-content aqueous suspension or a dried product thereof would reduce the proportion of celluloses contained in the food product and thus reduce influences on the versatility and quality of the food products. Accordingly, the proportion can be controlled within a wider range, and may be out of the numeric range specified above.

The structural strengthening in the present disclosure indicates an increase in structural strength of the entire hardened food product when the food material containing the structural strengthening agent is hardened under its hardening conditions (which vary depending on the food product. For example, water is frozen under a low-temperature condition in the case of ice cream). The structural strength can be measured and evaluated with a standard rheometer ("Rheoner" available from Yamaden Co., Ltd. (attachment: wedge-shaped (upper width of 30 mm×distal end width of 1 mm)). It, however, is usually known that the value measured by an analyzer does not always match with the sensory perception. Thus, it is desirable to use combination of the structural strength and sensory evaluation.

One or more embodiments of the present invention also cover a method of producing a food product, comprising mixing the structural strengthening agent according to one or more embodiments of the present invention with the food material, and hardening the mixture. The details of the structural strengthening agent, the food material, the mixing method, and the hardening method are as described above.

Furthermore, one or more embodiments of the present invention also cover a method of increasing the structural strength of the food product, the method comprising mixing the structural strengthening agent according to the present invention with the food material, and hardening the mixture. The details of the structural strengthening agent, the food material, the mixing method, and the hardening method are as described above.

One or more embodiments of the present invention also cover a method of improving the taste and physical properties of the food product, the method comprising mixing the structural strengthening agent according to the present invention with the food material, and hardening the mixture. The details of the structural strengthening agent, the food material, the mixing method, and the hardening method are as described above.

Although the reason is not completely clarified why the structural strength is improved by the structural strengthening agent for a food product according to one or more embodiments of the present invention, the present inventors infer the following reason from the results of observations shown in FIGS. 1 to 4: The water-insoluble long-chain cellulose and the water-insoluble short-chain cellulose contained in the food material in a specific ratio are substantially homogeneously dispersed in the food material. As a result, the insoluble short-chain cellulose present between structure forming ingredients derived from the food material forms a latticed and/or braced structure inside gaps in the resulting structured product, and the gaps in the structured product are filled with the water-insoluble long-chain cellulose. The dimension of the latticed and/or braced structure is thereby reduced and the gaps are filled with microwalls or microplates. The structural strength is thus improved by such a synergistic effect.

Although the relation between the increase in the structural strength and the effect of improving the taste and physical properties of the food product is not completely clarified, the results in Examples below suggest that the food products having a relatively hard structure, such as ice creams, frozen desserts, and solid fats, have a strengthened structure. Such a food product is difficult to disintegrate or melt in the mouth, thus reducing elution of ingredients causing sweetness and/or oiliness derived from the food product, and thus reducing the persistence in the mouth. The structural strengthening also reduces a significant increase in surface area of the grains of the food product caused by disintegration or melting, leading to a light taste in the mouth or a reduction in cold stimuli perceived from food products containing water cooled by freezing or refrigeration.

In contrast, in the food products having a relatively soft structure, such as soft-serve ice creams and whipped cream, their dense structures are retained by strengthening the structure, increasing the retention (overrun) of fine air bubbles to provide a very smooth, fluffy, highly whipped soft texture. Thus, the contact of ingredients causing sweetness and/or oiliness derived from the food product with the mouth is reduced, thus reducing the persistence therein. For the same reason, a significant increase in surface area of grains of the food product is reduced, leading to a light taste in the mouth or a reduction in cold stimuli perceived from food products containing water cooled by freezing or refrigeration.

In jellies and konjac gel having a mild hardness compared to those of ice creams and soft-serve ice creams, the structural strengthening obstructs disintegration or syneresis of the food product according to one or more embodiments of the present invention having a strengthened structure in the mouth, thereby reducing the elution of ingredients causing sweetness and/or oiliness derived from the food product and thus persistence in the mouth. A significant increase in surface area of grains of the food product by disintegration or elution of ingredients by syneresis is prevented, leading to a light taste in the mouth or a reduction in cold stimuli perceived from food products containing water cooled by freezing or refrigeration.

EXAMPLES

[Example 1] Verification of Synergetic Effect of Combined Use of Celluloses Having Different Properties The synergetic effect of combined use of celluloses having different properties was examined using ice cream. Nata de coco (available from Style One, in syrup, cellulose solid content: 1.5 mass %, used as a cellulose dispersion prepared by disintegrating the whole product with the syrup in a homogenizer "Physcotron" (available from MICROTEC CO., LTD.) for 5 minutes) was selected as a water-insoluble long-chain cellulose, and an NP fiber (available from Nippon Paper Industries Co., Ltd., dried powder) was selected as a water-insoluble short-chain cellulose, and were subjected to a test. The food material was prepared as follows: Materials having a composition shown in Table 1 were sufficiently mixed with stirring to prepare an ice cream material (food material), and the celluloses were added thereto in a mixing ratio shown in Table 2, followed by mixing and dispersing. The ice cream material was then cooled for 50 minutes with stirring using an ice cream maker ("Ice Deli" available from Haier) in an ice cream making mode. The product was left to stand at −20° C. for 12 hours or more for storage. The hardness of the ice cream was determined by measuring the rupture stress at 1.000 mm/sec with a rheometer ("Rheoner" available from Yamaden Co., Ltd. (attachment: wedge-shaped (upper width of 30 mm×distal end width of 1 mm)). The melting resistance was evaluated by transferring 10 mL of the ice cream material into a 50-mL Falcon tube (available from Falcon), leaving the ice cream material at −20° C. for 3 hours or more for storage, horizontally cutting the Falcon tube at a position 5 mm from the bottom, leaving the cut portion at normal temperature, and measuring the amount of melted liquid. For the structural change in the ice cream, the surface of a section of freeze-dried ice cream was observed with a tabletop scanning electron microscope (tabletop SEM, available from Hitachi, Ltd., "Miniscope TM3000") at an appropriate magnification. The texture (hardness and melting properties) and the taste (cold stimuli in the mouth, persistence, and richness (milkiness, thickness of taste)) were subjected to sensory evaluation according to the criteria for evaluation below. The results are shown in Table 2.

The sensory evaluation was performed by ten trained sensory inspectors. The sensory inspectors were selected from those who underwent the discrimination trainings A) to C) below, had particularly good results, had experiences of product development, had rich knowledge of quality such as the tastes of food products and the texture thereof, and were able to perform absolute evaluations on the items of sensory inspections.

A) Taste discrimination test about seven samples in total including aqueous five-taste samples (i.e., sweet taste: sugar, sour taste: tartaric acid, umami taste: sodium glutamate, salty taste: sodium chloride, and bitter taste: caffeine) of the respective ingredients each having a concentration close to the threshold, and two samples of distilled water. The inspectors must correctly discriminate the samples of the five tastes from the seven samples in total.

B) Concentration discrimination test to correctly discriminate the difference in concentration among five salt solutions having different concentrations and the difference in concentration among five aqueous acetic acid solutions having different concentrations.

C) Three-point discrimination test to correctly discriminate one low-viscosity soy sauce sample from three soy source samples having slightly different viscosities (two samples having the same viscosity, one sample having a low viscosity).

For all the items for evaluation, all of the ten inspectors preliminarily evaluated standard samples to standardize the scores according to the criteria for evaluation, and then performed objective sensory inspections. For each of the evaluation items, the inspectors selected the numeric values closest to their evaluations from the scores of 1 to 5 in the evaluation ranking. The result of each evaluation item was determined from calculation of the arithmetic average of the ten scores given by the inspectors. The inspectors added free comments (not shown) in addition to the criteria for evaluation below.

<Criteria 1 for Evaluation> Texture (Degree of Hardness)
  5: hard
  4: slightly hard
  3: intermediate
  2: slightly soft
  1: soft <Criteria 2 for Evaluation> Texture (Melting Properties)
  5: hard to melt
  4: slightly hard to melt
  3: intermediate
  2: slightly easy to melt
  1: easy to melt <Criteria 3 for Evaluation> Taste (Degree of Cold Stimuli)
  5: weak cold stimuli in the mouth (preferred)
  4: relatively weak cold stimuli in the mouth (somewhat preferred)
  3: intermediate
  2: relatively strong cold stimuli in the mouth (somewhat unpreferred)
  1: strong cold stimuli in the mouth (unpreferred)

<Criteria 4 for Evaluation> Taste (Degree of Persistence)
  5: weak persistence in the mouth, and dry and light feeling (preferred)
  4: relatively weak persistence in the mouth, and dry and somewhat light feeling (somewhat preferred)
  3: intermediate
  2: relatively strong persistence in the mouth, and wet and somewhat heavy feeling (somewhat unpreferred)
  1: strong persistence in the mouth, and wet and heavy feeling (unpreferred)

<Criteria 5 for Evaluation> Taste (Degree of Richness (Milkiness, Thickness of Taste))
  5: strong richness (milkiness, thickness of taste) felt in the mouth (preferred)
  4: relatively strong richness (milkiness, thickness of taste) felt in the mouth (somewhat preferred)
  3: intermediate
  2: relatively weak richness (milkiness, thickness of taste) felt in the mouth, slightly watery (somewhat unpreferred)
  1: weak richness (milkiness, thickness of taste) felt in the mouth, watery (unpreferred)

<Criteria 6 for Evaluation> Comprehensive Evaluation of Texture and Taste
  5: good texture and taste
  4: relatively good texture and taste
  3: intermediate
  2: relatively bad texture and taste
  1: bad texture and taste

TABLE 1

| Ice cream materials | | Preparation condition |
| --- | --- | --- |
| Sugar | 25 g | Mixed with stirring, |
| Egg yolk | 20 g | hardened with ice |
| Fresh cream | 100 mL | cream maker |
| Milk | 40 mL | |

TABLE 2

Figure 2:
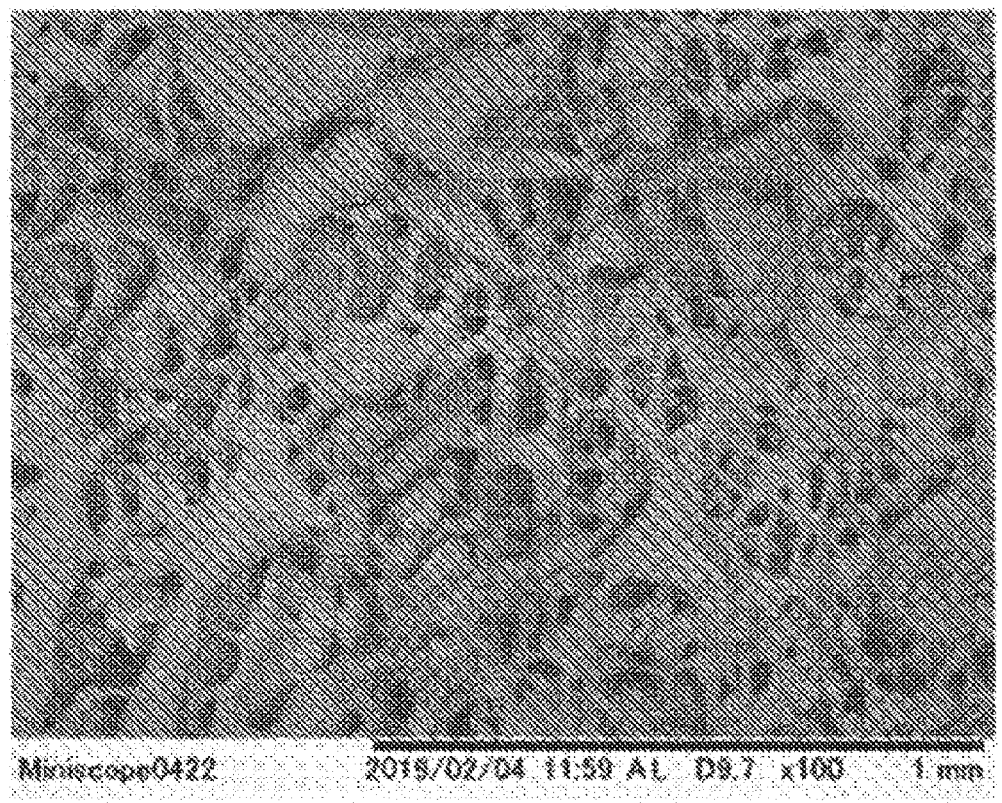
FIG. 2 is a sectional photograph of a freeze-dried product of the ice cream prepared in Comparative Sample 2 in Example 1, the photograph being taken from surface observation (100×) with a tabletop scanning electron microscope.
Figure 3:
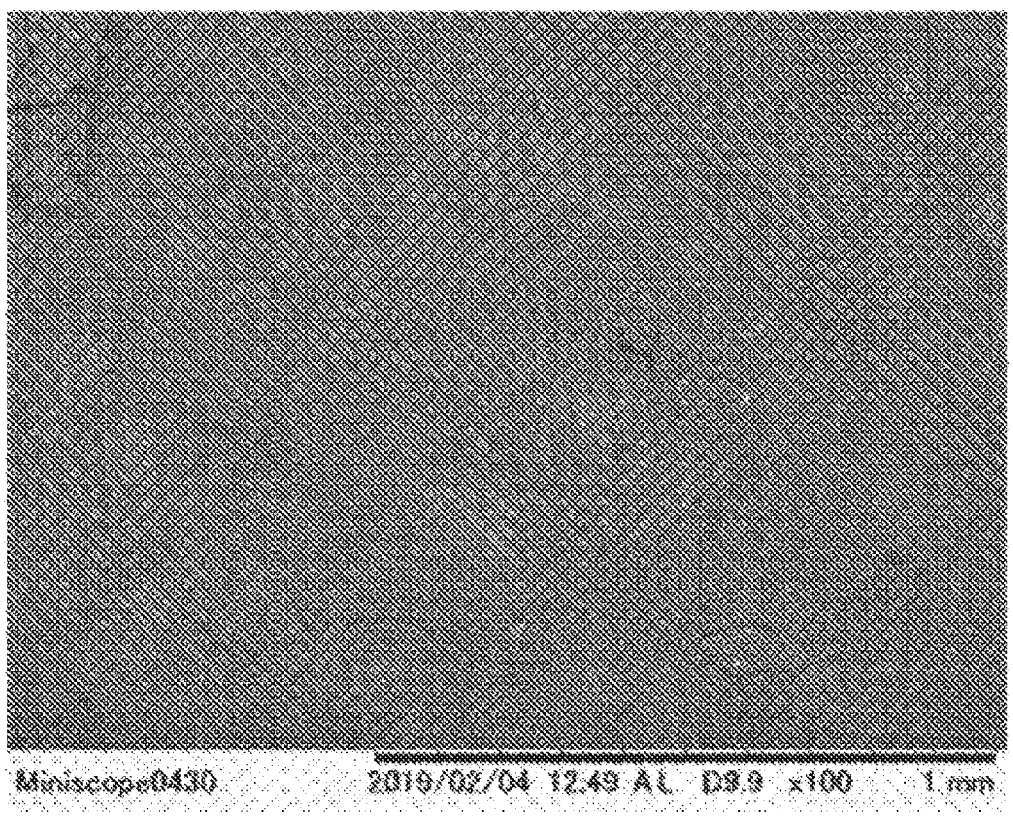
FIG. 3 is a sectional photograph of a freeze-dried product of the ice cream prepared in Comparative Sample 3 in Example 1, the photograph being taken from surface observation (100×) with a tabletop scanning electron microscope.
Figure 4:
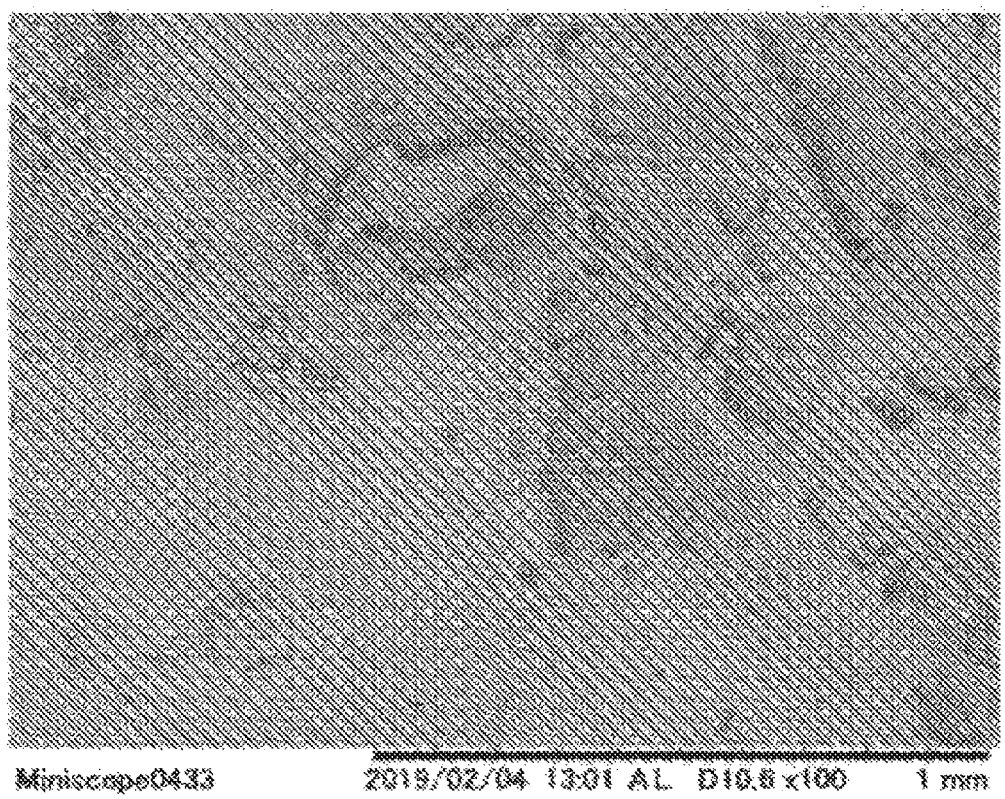
FIG. 4 is a sectional photograph of a freeze-dried product of the ice cream prepared in Inventive Sample 1 in Example 1, the photograph being taken from surface observation (100×) with a tabletop scanning electron microscope.
Figure 5:
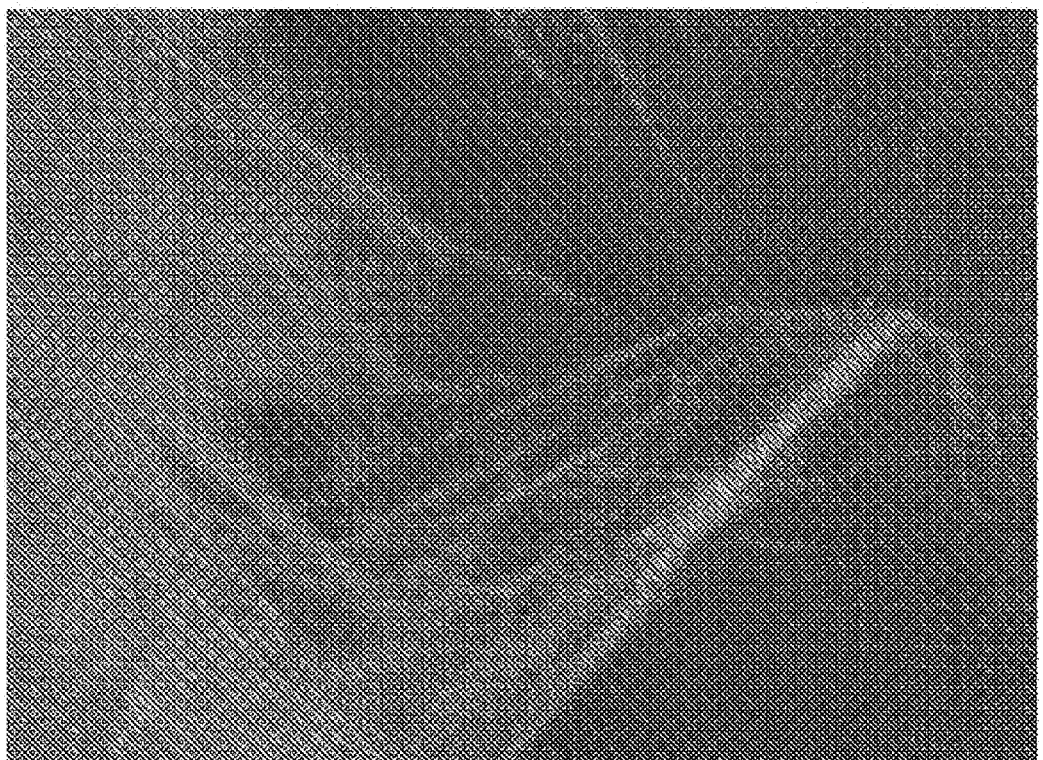
FIG. 5 is a sectional photograph of cellulose fibers used in Analytical Sample 1 in Example 2, the photograph being taken from surface observation (2000×) with a tabletop scanning electron microscope.
Figure 6:
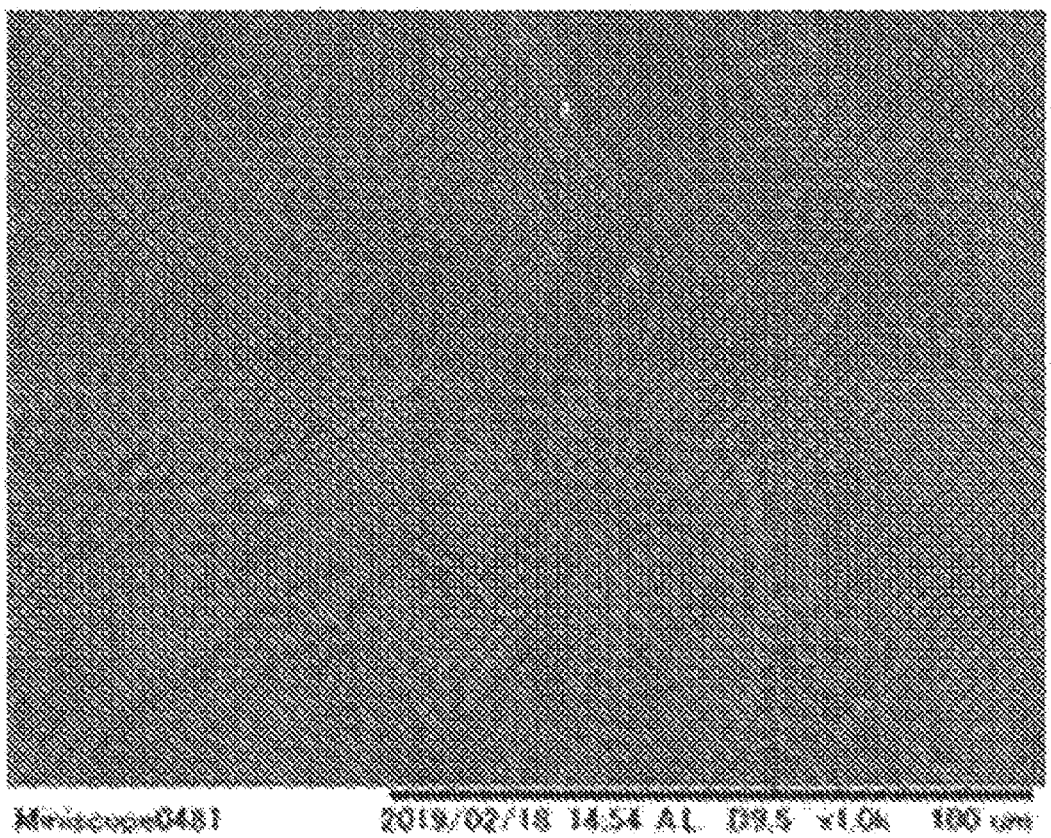
FIG. 6 is a sectional photograph of cellulose fibers used in Analytical Sample 2 in Example 2, the photograph being taken from surface observation (1000×) with a tabletop scanning electron microscope.
Figure 7:
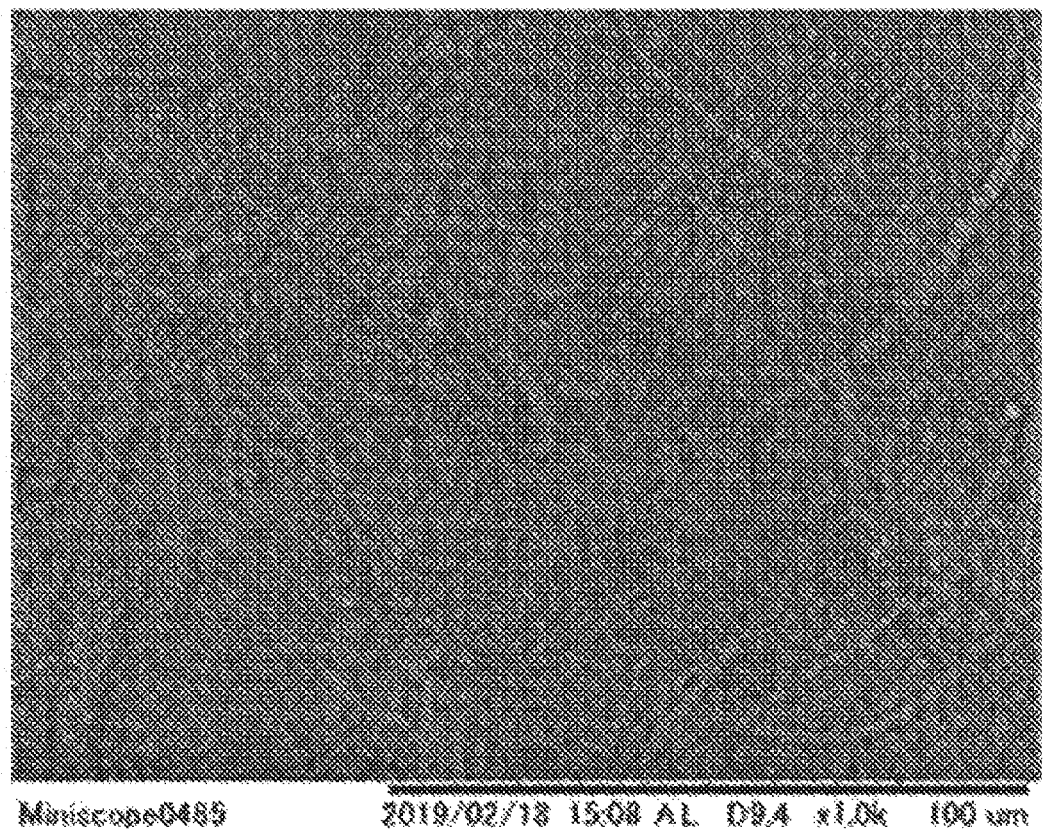
FIG. 7 is a sectional photograph of cellulose fibers used in Analytical Sample 3 in Example 2, the photograph being taken from surface observation (1000×) with a tabletop scanning electron microscope.
Figure 8:
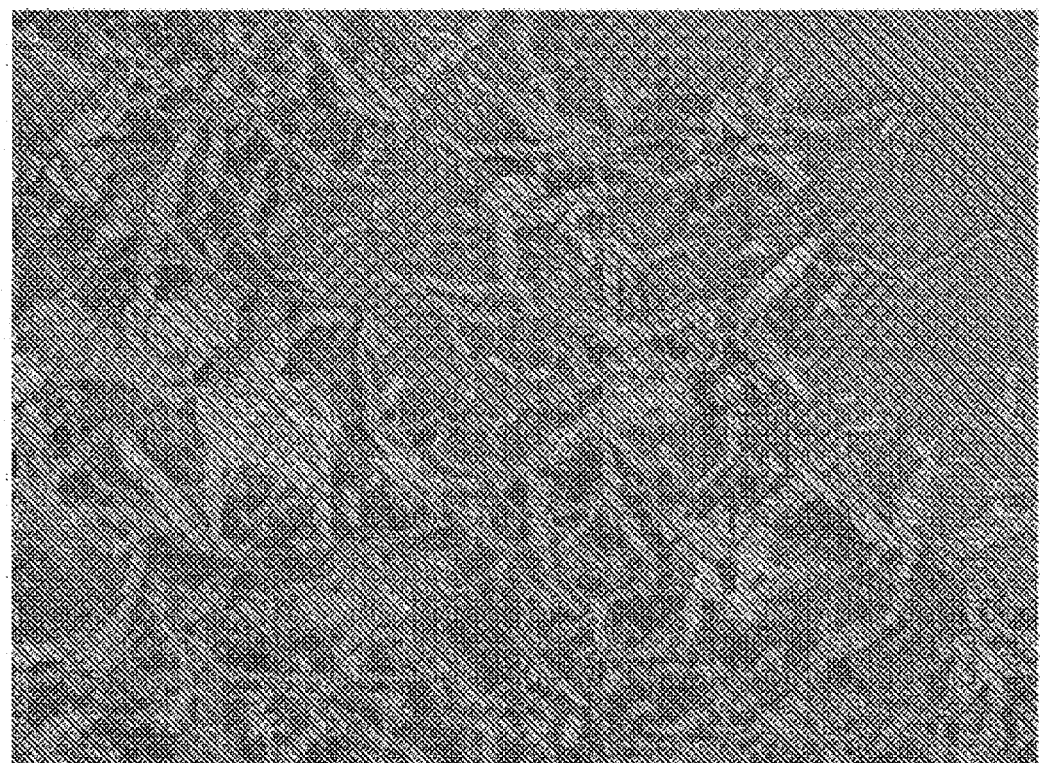
FIG. 8 is a sectional photograph of cellulose fibers used in Analytical Sample 4 in Example 2, the photograph being taken from surface observation (150×) with a tabletop scanning electron microscope.
Figure 9:
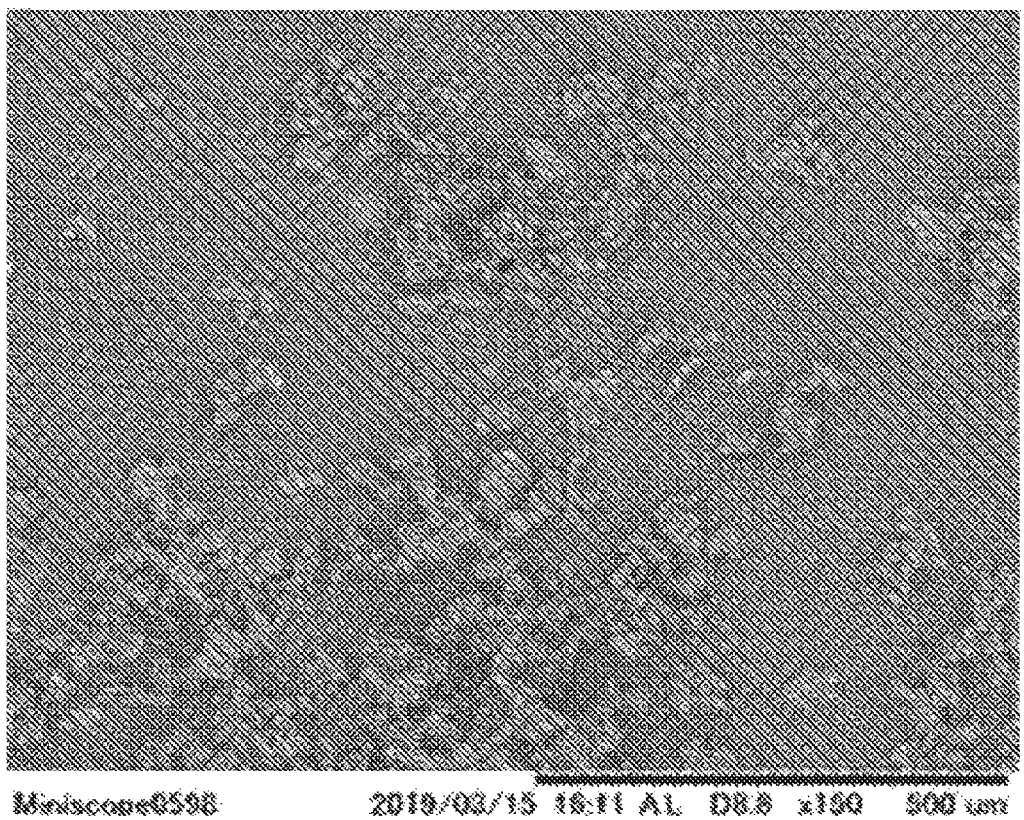
FIG. 9 is a sectional photograph of cellulose fibers used in Analytical Sample 5 in Example 2, the photograph being taken from surface observation (150×) with a tabletop scanning electron microscope.

|  |  | Comparative Sample 1 | Comparative Sample 2 | Comparative Sample 3 | Inventive Sample 1 |
|---|---|---|---|---|---|
| Food materials (g) | Ice cream material (Table 1) | 185 | 185 | 185 | 185 |
|  | Syrup for immersing nata de coco | 150 | 150 | — | — |
| Hardening agents (g) | Long-chain cellulose — Syrup containing disintegrated nata do coco | — | — | 150 | 150 |
|  | Short-chain cellulose — NP fiber | — | 15 | — | 15 |
| Hardened product | Total amoung (g) | 335 | 350 | 335 | 350 |
|  | Observation — Geometry of tissue (observation with tabletop SEM × 100) | FIG. 1 | FIG. 2 | FIG. 3 | FIG. 4 |
|  | Physical properties — Rupture stress (Pa) | 43330 | 110000 | 150000 | 183300 |
|  | Melting resistance (liquid amount (mL) after 45 min at normal temperature) | 6.5 | 7.0 | 10.0 | 0.3 |
|  | Sensory evaluation — Texture (degree of hardness) | 1 | 2 | 3 | 5 |
|  | Texture (melting properties) | 1 | 1 | 1 | 5 |
|  | Taste (degree of cold stimuli) | 1 | 2 | 2 | 5 |
|  | Taste (degree of persistence) | 1 | 2 | 2 | 5 |
|  | Taste (degree of richness (milkiness, thickness of taste)) | 1 | 1 | 3 | 5 |
|  | Comprehensive evaluation of texture and taste | 1 | 2 | 2 | 5 |

The syrup for immersing nata de coco (composition: sugar, sorbitol, an acidulant, an antioxidant (V.C), and a fragrance) as a food product material was added in Comparative Samples 1 and 2 as shown Table 2 because the syrup was also added when the nata de coco disintegrated in the syrup, i.e., the long-chain cellulose was added (Comparative Sample 3, Inventive Sample 1). Thus, all Comparative Samples and Inventive Sample have the same taste and concentration. Although an attempt to recover and add a dried product of the disintegrated nata de coco as a long-chain cellulose was made, the dried product aggregated to lose the geometry and the properties, and was not returned to the original state even after wetted. For this reason, this method was not used.

The results in Table 2 show that compared to the case where the celluloses were not added (Comparative Sample 1), the degree of hardness in the texture was not felt significantly different while the rupture stress increased in the case where only the long-chain cellulose was added (0.67 mass % in the hardened product) (Comparative Sample 3) and the case where only the short-chain cellulose was added (4.29 mass % in the hardened product) (Comparative Sample 2). Furthermore, an improvement in melting resistance was not observed, and the differences in texture and taste in the sensory evaluation were small. In short, no significant change was observed in the cases where each single cellulose was added. In contrast, in the case where the long-chain cellulose and the short-chain cellulose were used in combination (Inventive Sample 1), the highest rupture stress was observed, and a significant hardness was recognized in the sensory evaluation. This sample also exhibited the highest melting resistance from the observed value and the results of sensory evaluation. The results also demonstrate that the cold stimuli and the persistence of sweetness and oiliness in the taste were significantly reduced, and the richness (milkiness and thickness of taste) were enhanced.

The sections of the freeze-dried products of these hardened products were observed with a tabletop SEM (100×). Compared to the case where the celluloses were not added (Comparative Sample 1, FIG. 1), filled gaps between ice crystals were observed in the case where only the long-chain cellulose was added (0.67 mass % in the hardened product) (Comparative Sample 3, FIG. 3). In contrast, lattices and braces extended in the gaps between ice crystals were observed in the case where only the short-chain cellulose was added (4.29 mass % in the hardened product) (Comparative Sample 2. FIG. 2). In contrast, filled gaps between ice crystals were observed in the case where the long-chain cellulose and the short-chain cellulose were used in combination (Inventive Sample 1, FIG. 4). These observations suggest that the structural strength was synergistically improved in the case where the long-chain cellulose and the short-chain cellulose were used in combination for the following reason: The water-insoluble short-chain cellulose present between the structure forming ingredients derived from the food material formed a latticed and/or braced structure inside gaps in the structured product and the gaps in the structured product were filled with the water-insoluble long-chain cellulose. The dimension of the latticed and/or braced structure was thereby reduced and the gaps were filled with microwalls or microplates.

Although the relation between this synergistical increase in structural strength and the effect of improving the taste and physical properties is not completely clarified, from the improved melting resistance, the present inventors infer that the structural strengthening resulted in a food product according to one or more embodiments of the present invention having a strengthened structure. Such a food product was barely disintegrated or melted in the mouth, thus reducing elution of water and ingredients causing sweetness or oiliness derived from the food product, and reducing the persistence in the mouth. Furthermore, the present inventors infer that a significant increase in surface area of grains of the food product caused by disintegration or melting was prevented, leading to a light taste in the mouth or a reduction in cold stimuli perceived. The present inventors also infer that due to the reduction in elution of water, the sweet or oily ingredients keeping their richness were brought into contact with the tongue, resulting in perception of the richness (milkiness, thickness of taste) without persistence.

[Example 2] Geometric Analysis of Water-Insoluble Cellulose

In Example 1, the water-insoluble long-chain cellulose used was nata de coco (available from Style One, in syrup, cellulose solid content: 1.5 mass %) in the form of a cellulose dispersion prepared by disintegrating the whole product with syrup in a homogenizer "Physcotron" (available from MICROTEC CO., LTD.) for 5 minutes, whereas the water-insoluble short-chain cellulose used was NP fiber (Nippon Paper Industries Co., Ltd., dried powder). These celluloses and other celluloses were subjected to geometric analysis.

In the celluloses and the cellulose-containing compositions shown in Table 3, the powdery cellulose was applied onto a carbon tape, and the wet cellulose was dried at 70° C. The images of sections of the resulting sheet-shaped celluloses were photographed with a tabletop SEM (150× to 2000×). In each of the photographed images, 30 cellulose fibers were visually selected at random. The aspect ratio of each fiber was determined where the aspect ratio was defined by the ratio of the length (μm) of the long side to the diameter (μm) corresponding to the length (μm) of the short side in the rectangular image of the fiber. The average, maximum, and minimum of the 30 measured values were determined for each type of cellulose. The cellulose content known from the product specification was cited as it was. For the nata de coco in syrup having a cellulose content unknown from the product specification, the cellulose content was determined as follows: The nata de coco was sufficiently immersed in running water before disintegration to replace the syrup with water, and then was dried to measure the solid content. For the dried powder of cores of corn (Zea mays) having a cellulose content unknown from the product specification, the cellulose content was measured by a modified Prosky method, which is a standard method of measuring a food fiber content.

The observed images are shown in FIGS. 5, 6, 7, 8, and 9, and the observed results are shown in Table 3.

The results demonstrate that the wet celluloses in Analytical Samples 1 to 3 have a relatively small diameter and a relatively large minimum aspect ratio, indicating water-insoluble long-chain celluloses. The results also demonstrate that the dried cellulose and the dried cellulose-containing composition in Analytical Samples 4 and 5, respectively, have a relatively large diameter and a small aspect ratio, indicating water-insoluble short-chain celluloses. The dried powder of cores of corn (Zea mays) selected as the cellulose-containing composition was prepared as follows: Dried powder (1 g) was suspended in water (100 mL), and was thoroughly stirred to sufficiently dissolve the water-soluble ingredient. The residue was then recovered by vacuum filtration through a 0.45-μm aqueous filter, and was sufficiently dried with a hot-air dryer. The massive dried powder was crushed with a mixer (Wonder Crusher WC-3L, available from OSAKA CHEMICAL Co., Ltd.) until particle size became uniform again. The crushed product was subjected to SEM observation. This fibrous product (it was inferred that the fibrous product was composed mainly of a cellulose because 60 mass % of an insoluble food fiber was contained and the water-soluble ingredient was dissolved out) was measured as described above.

[Example 3] Verification of Advantageous Effects of Invention in Combined Use of Various Celluloses To verify the effect in combined use of the water-insoluble long-chain celluloses and water-insoluble short-chain celluloses where the geometries thereof were measured in Example 2, ice cream was prepared as in Example 1, and was subjected to sensory evaluation as in Example 1. The results are shown in Table 4.

TABLE 3

| | | Analytical Sample 1 | Analytical Sample 2 | Analytical Sample 3 | Analytical Sample 4 | Analytical Sample 5 |
|---|---|---|---|---|---|---|
| Cellulose | Name | Nata de coco | BINFi-s Wfo-10002 | Chemical pulp cellulose nanofiber | NP fiber | Plant powder (cores of corn) |
| | Manufacturer | Style One | Sugino Machine | Deio Paper | Nippon Paper | Commercially available |
| | State | Wet, disintegrated with syrup in homogenizer "Physcotron" (MICROTEC CO., LTD.) for 5 min | Wet | Wet | Dry | Dry |
| | Derived from | Produced by Acetobacteraceae | Pulp | Pulp | Pulp | Corn |
| Measured values | Cellulose content (mass %) | 1.5 | 2.0 | 2.0 | 100 | (60 mass % as insoluble food fibers) |
| | Diameter (μm) Average | 0.88 ± 0.37 | 1.11 ± 0.59 | 1.36 ± 0.64 | 14.17 ± 5.45 | 21.73 ± 8.93 |
| | Maximum | 1.7 | 3.0 | 3.5 | 30 | 45 |
| | Minimum | 0.3 | 0.2 | 0.5 | 5 | 5 |
| | Aspect ratio Average | NA | NA | NA | 8.79 ± 6.73 | 2.00 ± 1.25 |
| | Maximum | NA | NA | NA | 32.5 | 6.0 |
| | Minimum | 11.8 | 2.0 | 3.5 | 1.5 | 1.0 |
| Classification | | Long-chain | Long-chain | Long-chain | Short-chain | Short-chain |

TABLE 4

| | | Cellulose | | Comparative Sample 1 | Comparative Sample 4 | Inventive Sample 1 | Inventive Sample 3 | Inventive Sample 4 | Inventive Sample 5 | Inventive Sample 6 |
|---|---|---|---|---|---|---|---|---|---|---|
| | | Maximum diameter (μm) | Minimum aspect ratio | | | | | | | |
| Food materials (g) | Ice cream material (Table 1) | — | — | 185 | 185 | 185 | 185 | 185 | 185 | 185 |
| | Syrup for immersing nata de coco | — | — | 150 | — | — | — | — | — | — |
| | Water | — | — | — | 150 | — | — | — | — | — |
| Hardening agents (g) | Long-chain cellulose | Syrup containing disintegrated nata de coco (Sample 1) | 1.7 | 11.8 | — | — | 150 | 150 | — | — | — |
| | | BINFi-s Wfo-10002 (aqueous suspension) (Sample 2) | 3.0 | 2.0 | — | — | — | — | 150 | — | 150 |
| | | Chemical pulp cellulose nanofiber (aqueous suspension) (Sample 3) | 3.5 | 3.5 | — | — | — | — | — | 150 | — |
| | Short-chain cellulose | NP fiber (Sample 4) | 30 | 1.5 | — | — | 15 | — | 15 | 15 | — |
| | | Plant powder (core of com) (Sample 5) | 45 | 1.0 | — | — | — | 15 | — | — | 15 |
| Hardened product | Total amoung (g) | | — | — | 335 | 335 | 350 | 350 | 350 | 350 | 350 |
| | Sensory evaluation | Texture (degree of hardness) | — | — | 1 | 1 | 5 | 5 | 5 | 5 | 5 |
| | | Texture (melting properties) | — | — | 1 | 1 | 5 | 5 | 5 | 5 | 5 |
| | | Taste (degree of cold stimuli) | — | — | 1 | 1 | 5 | 5 | 5 | 5 | 5 |
| | | Taste (degree of persistence) | — | — | 1 | 1 | 5 | 5 | 5 | 5 | 5 |
| | | Taste (degree of richness (milkiness, thickness of taste)) | — | — | 1 | 1 | 5 | 5 | 5 | 5 | 5 |
| | | Comprehensive evaluation of texture and taste | — | — | 1 | 1 | 5 | 5 | 5 | 5 | 5 |

The results obtained in combinations other than that of celluloses verified in Example 1 were very similar to those in Inventive Sample 1, and thus the advantageous effects of one or more embodiments of the present invention are universally provided by any celluloses having very similar geometries to those in Example 1.

Specifically, the results reveal that the water-insoluble long-chain cellulose may have a diameter of 3.5 μm or less and an aspect ratio of 2.0 or more and that the water-insoluble short-chain cellulose may have a diameter of 5.0 μm or more and an aspect ratio of 32.5 or less.

[Example 4] Verification of Range of Mixing Ratio of Water-Insoluble Long-Chain Cellulose to Water-Insoluble Short-Chain Cellulose In Examples 1 and 3, the water-insoluble long-chain cellulose and the water-insoluble short-chain cellulose were used in combination in a mass ratio of 13:87 to 17:83. The range of the ratio of the water-insoluble long-chain cellulose to the water-insoluble short-chain cellulose used in combination was verified. Ice cream was prepared as in Example 1 except that the mixing ratio of the water-insoluble long-chain cellulose to the water-insoluble short-chain cellulose was varied, and was subjected to sensory evaluation as in Example 1. The results are shown in Table 5.

TABLE 5

| | | | Comparative Sample 1 | Comparative Sample 5 | Inventive Sample 7 | Inventive Sample 8 | Inventive Sample 9 | Inventive Sample 1 | Inventive Sample 10 | Inventive Sample 11 |
|---|---|---|---|---|---|---|---|---|---|---|
| Food materials (g) | Ice cream material (Table 1) | | 185 | 185 | 185 | 185 | 185 | 185 | 185 | 185 |
| | Syrup for immersing nata de coco | | 150 | — | — | — | — | — | — | — |
| Hardening agents (g) | Long-chain cellulose | Syrup containing disintegrated nata de coco (solid cellulose) (Sample 1) | — | 150 (2.25) | 150 (2.25) | 150 (2.25) | 150 (2.25) | 150 (2.25) | 150 (2.25) | 150 (2.25) |
| | Short-chain cellulose | NP fiber (Sample 4) | — | 0.015 | 1.5 | 4.5 | 8.5 | 15 | 30 | 50 |
| | Long-chain cellulose: Short-chain cellulose (mixing ratio) | | — | 99:1 | 40:50 | 33:87 | 21:79 | 13:87 | 7:93 | 4:95 |

TABLE 5-continued

|  |  |  | Comparative Sample 1 | Comparative Sample 5 | Inventive Sample 7 | Inventive Sample 8 | Inventive Sample 9 | Inventive Sample 1 | Inventive Sample 10 | Inventive Sample 11 |
|---|---|---|---|---|---|---|---|---|---|---|
| Hardened product | Total amoung (g) | | 335 | 335 | 336.5 | 338.5 | 343.5 | 350 | 365 | 385 |
| | Sensory evaluation | Texture (degree of hardness) | 1 | 2 | 4 | 4 | 5 | 5 | 5 | 4 |
| | | Texture (melting properties) | 1 | 1 | 4 | 4 | 5 | 5 | 5 | 4 |
| | | Taste (degree of cold stimuli) | 1 | 2 | 4 | 5 | 5 | 5 | 5 | 4 |
| | | Taste (degree of persistence) | 1 | 2 | 4 | 5 | 5 | 5 | 5 | 4 |
| | | Taste (degree of richness (milkiness, thickness of taste)) | 1 | 2 | 4 | 5 | 5 | 5 | 5 | 4 |
| | | Comprehensive evaluation of texture and taste | 1 | 2 | 4 | 5 | 5 | 5 | 5 | 4 |

The results demonstrate that the advantageous effects of one or more embodiments of the present invention are provided by the insoluble long-chain cellulose and the insoluble short-chain cellulose blended in a mass ratio of usually 40:60 to 4:96.

[Example 5] Verification of Range of Total Content of Water-Insoluble Long-Chain Cellulose and Water-Insoluble Short-Chain Cellulose in Food Material In Examples 1 and 3, the total content of the water-insoluble long-chain cellulose and the water-insoluble short-chain cellulose in the food material was within the range of 17.25 to 17.75 mass %. The range of the total content of the hardening agent for a food product according to one or more embodiments of the present invention. i.e., the water-insoluble long-chain cellulose and the water-insoluble short-chain cellulose in the food material was verified. Ice cream was prepared as in Example 1 except that the type of water-insoluble long-chain cellulose and the total content of the water-insoluble long-chain cellulose and the water-insoluble short-chain cellulose were varied, and was subjected to sensory evaluation as in Example 1. The results are shown in Table 6.

The results demonstrate that the lower limit of the total amount of the insoluble long-chain cellulose and the insoluble short-chain cellulose in the food material may be 4.5 mass %.

[Example 6] Verification 1 of Advantageous Effects of Invention in Other Food Products In Examples 1 and 3, ice cream (milk-based) was selected as target hardened products to verify the advantageous effects of one or more embodiments of the present invention. It was verified whether the advantageous effects of one or more embodiments of the present invention was also provided by the ice cream materials shown in Table 7 other than the ice cream (milk-based). Several ice cream materials were prepared in the mixing ratios shown in Table 7. Ice cream was prepared as in Example 1, and was subjected to sensory evaluation as in Example 1. The results are shown in Table 8.

TABLE 7

| ice cream materials | | | Preparation conditions |
|---|---|---|---|
| Soy milk-based | Sugar | 25 g | Mixed with stirring, hardened with ice cream maker |
| | Egg yolk | 20 g | |
| | Fresh cream | 100 mL | |
| | Soy milk | 40 mL | |

TABLE 6

|  |  |  | Comparative Sample 4 | Inventive Sample 12 | Inventive Sample 13 | Inventive Sample 14 | Inventive Sample 4 | Inventive Sample 15 | Inventive Sample 16 |
|---|---|---|---|---|---|---|---|---|---|
| Food materials (g) | Ice cream material (Table 1) | | 185 | 185 | 185 | 185 | 185 | 185 | 185 |
| | Water | | 150 | — | — | — | — | — | — |
| Hardening agents (g) | Long-chain cellulose | BINFi-s Wfo-10002 (aqueous suspension) (Sample 2) | — | 150 (3.0) | 150 (3.0) | 150 (3.0) | 150 (3.0) | 150 (3.0) | 150 (3.0) |
| | Short-chain cellulose | NP fiber (Sample 4) | — | 1.5 | 4.5 | 5.5 | 15 | 30 | 50 |
| | Long-chain cellulose + Short-chain cellulose (Total content in Food material, mass %) | | — | 4.5 | 7.5 | 11.5 | 18 | 33 | 53 |
| Hardened product | Total amoung (g) | | 335 | 336.5 | 339.5 | 343.5 | 350 | 365 | 385 |
| | Sensory evaluation | Texture (degree of hardness) | 1 | 4 | 5 | 5 | 5 | 5 | 4 |
| | | Texture (melting properties) | 1 | 4 | 5 | 5 | 5 | 5 | 4 |
| | | Taste (degree of cold stimuli) | 1 | 4 | 5 | 5 | 5 | 5 | 4 |
| | | Taste (degree of persistence) | 1 | 4 | 5 | 5 | 5 | 5 | 4 |
| | | Taste (degree of richness (milkiness, thickness of taste)) | 1 | 4 | 5 | 5 | 5 | 5 | 4 |
| | | Comprehensive evaluation of texture and taste | 1 | 4 | 5 | 5 | 5 | 5 | 4 |

TABLE 7-continued

| | ice cream materials | | Preparation conditions |
|---|---|---|---|
| Powdered skim milk-based | Sugar<br>Egg yolk<br>Fresh cream<br>Powdered skim milk | 25 g<br>20 g<br>100 mL<br>40 mL | Mixed with stirring, hardened with ice cream maker |
| Non-cream based | Sugar<br>Egg yolk<br>Milk | 25 g<br>20 g<br>140 mL | Mixed with stirring, hardened with ice cream maker |

TABLE 8

| | | | Comparative Sample 5 | Comparative Sample 6 | Comparative Sample 7 | Inventive Sample 17 |
|---|---|---|---|---|---|---|
| Food materials (g) | Ice cream material (Table 7) | Soy milk-based | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 335 | 350 | 335 | 350 |
| | Sensory evaluation | Texture (degree of hardness) | 1 | 2 | 3 | 5 |
| | | Texture (melting properties) | 1 | 1 | 1 | 5 |
| | | Taste (degree of cold stimuli) | 1 | 2 | 2 | 5 |
| | | Taste (degree of persistence) | 1 | 2 | 2 | 5 |
| | | Taste (degree of richness (milkiness, thickness of taste)) | 1 | 1 | 3 | 5 |
| | | Comprehensive evaluation of texture and taste | 1 | 2 | 2 | 5 |

| | | | Comparative Sample 8 | Comparative Sample 9 | Comparative Sample 10 | Inventive Sample 18 |
|---|---|---|---|---|---|---|
| Food materials (g) | Ice cream material (Table 7) | Powdered skim milk-based | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 335 | 350 | 335 | 350 |
| | Sensory evaluation | Texture (degree of hardness) | 1 | 2 | 3 | 5 |
| | | Texture (melting properties) | 1 | 1 | 1 | 5 |
| | | Taste (degree of cold stimuli) | 1 | 2 | 2 | 5 |
| | | Taste (degree of persistence) | 1 | 2 | 2 | 5 |
| | | Taste (degree of richness (milkiness, thickness of taste)) | 1 | 1 | 2 | 5 |
| | | Comprehensive evaluation of texture and taste | 1 | 2 | 2 | 5 |

| | | | Comparative Sample 11 | Comparative Sample 12 | Comparative Sample 13 | Inventive Sample 19 |
|---|---|---|---|---|---|---|
| Food materials (g) | Ice cream material (Table 7) | Non-cream based | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 335 | 350 | 335 | 350 |
| | Sensory evaluation | Texture (degree of hardness) | 1 | 2 | 2 | 5 |
| | | Texture (melting properties) | 1 | 1 | 1 | 5 |
| | | Taste (degree of cold stimuli) | 1 | 2 | 2 | 5 |
| | | Taste (degree of persistence) | 1 | 2 | 2 | 5 |
| | | Taste (degree of richness (milkiness, thickness of taste)) | 1 | 1 | 1 | 5 |
| | | Comprehensive evaluation of texture and taste | 1 | 2 | 2 | 5 |

The results demonstrate that the advantageous effects of one or more embodiments of the present invention were ensured by combined use of the insoluble long-chain cellulose and the insoluble short-chain cellulose irrespective of the composition of the ice cream.

[Example 7] Verification of Advantageous Effects of Invention of Other Food Products Having Relatively Hard Form In Examples 1 and 3 to 6, the ice cream was selected as target hardened products to verify the advantageous effects of one or more embodiments of the present invention. The effects on the food materials shown in Table 9 other than those for the ice cream were verified, where the food products prepared from the food materials and then hardened had relatively hard forms. A variety of food materials were prepared at the mixing ratios shown in Table 9. Several food products were prepared under the preparation conditions shown in Table 9, and was subjected to sensory evaluation as in Example 1 (note that non-frozen products were eliminated from evaluation according to <Criteria 3 for evaluation> taste (degree of cold stimuli)). The results are shown in Table 10.

TABLE 9

| | Food materials | | | Preparation conditions |
|---|---|---|---|---|
| Frozen dessert | Gangarikun (soda flavor) | Available from Akagi Nyugyo | 200 g | Melted by heating, hardened by freezing at −20° C. |
| Solid fat | High-melting point palm oil | Available from Kaneda Aburaten | 200 g | Melted in bowl containing hot water, hardened by coiling at room temperature |
| Chocolate | Cacao butter | Commercially available | 70 g | Melted Matted in bowl containing hot water, mixed with stirring (using "Melting & Tempering Machine Mini Revolution FV-68 (available from FITEEC")), hardened by cooling at room temperature |
| | Cacao mass | Commerically available | 80 g | |
| | Sugar | Commercially available | 60 g | |

TABLE 10

| | | | Comparative Sample 14 | Comparative Sample 15 | Comparative Sample 16 | Inventive Sample 20 |
|---|---|---|---|---|---|---|
| Food materials (g) | Frozen dessert (Table 9) | | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 335 | 350 | 335 | 350 |
| | Physical properties | Rupture stress (Pa) | 20000 | 166700 | 33330 | 956700 |
| | | Melting resistance (liquid amount (mL) after 30 min at normal temperature) | 1.1 | 0.6 | 1.0 | 0.3 |
| | Sensory evaluation | Texture (degree of hardness) | 1 | 2 | 3 | 5 |
| | | Texture (melting properties) | 1 | 1 | 1 | 5 |
| | | Taste (degree of cold stimuli) | 1 | 2 | 2 | 5 |
| | | Taste (degree of persistence) | 1 | 1 | 1 | 4 |
| | | Taste (degree of richness (milkiness, thickness of taste)) | 1 | 1 | 2 | 4 |
| | | Comprehensive evaluation of texture and taste | 1 | 2 | 2 | 5 |

| | | | Comparative Sample 17 | Comparative Sample 18 | Comparative Sample 19 | Inventive Sample 21 |
|---|---|---|---|---|---|---|
| Food materials (g) | Solid fat (Table 9) | | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g): when mixed | | 335 | 350 | 335 | 350 |
| | Total amount (g): when separated water is removed before hardening | | 185 | 200 | 202.25 | 217.25 |
| | Sensory evaluation | Texture (degree of hardness) | 2 | 2 | 3 | 5 |
| | | Texture (melting properties) | 2 | 2 | 2 | 5 |
| | | Taste (degree of cold stimuli) | — | — | — | — |
| | | Taste (degree of persistence) | 2 | 2 | 2 | 5 |
| | | Taste (degree of richness (milkiness, thickness of taste)) | 3 | 2 | 2 | 5 |
| | | Comprehensive evaluation of texture and taste | 2 | 2 | 2 | 5 |

TABLE 10-continued

|  |  |  | Comparative Sample 20 | Comparative Sample 21 | Comparative Sample 22 | Inventive Sample 22 |
|---|---|---|---|---|---|---|
| Food materials (g) | Chocolate (Table 9) | | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g): when mixed | | 335 | 350 | 335 | 350 |
| | Total amount (g): when separated water is removed before hardening | | 185 | 200 | 202.25 | 217.25 |
| | Sensory evaluation | Texture (degree of hardness) | 2 | 2 | 3 | 5 |
| | | Texture (melting properties) | 2 | 2 | 2 | 5 |
| | | Taste (degree of cold stimuli) | — | — | — | — |
| | | Taste (degree of persistence) | 2 | 2 | 2 | 5 |
| | | Taste (degree of richness (milkiness, thickness of taste)) | 3 | 2 | 2 | 5 |
| | | Comprehensive evaluation of texture and taste | 2 | 2 | 2 | 5 |

The results demonstrate that the same advantageous effects of one or more embodiments of the present invention as those in the ice cream are ensured in the frozen desserts not containing fats. The results also demonstrate that the advantageous effects of one or more embodiments of the present invention other than the reduction in cold stimuli were ensured in the solid fat and chocolate which did not substantially contain water (although water was added simultaneously with addition of the water-insoluble long-chain cellulose, the separated water was removed after the cellulose was migrated to the fat by mixing with stirring).

[Example 8] Verification of Advantageous Effects of Invention Exerted on Other Food Products Having Relatively Soft Forms Example 7 verified the advantageous effects of one or more embodiments of the present invention on food materials for corresponding hardened products having relatively soft forms. In contrast, the advantageous effect on the food materials shown in Table 11 and hardened into relatively soft forms were verified in Example 8. Several food materials were prepared in mixing ratios shown in Table 11. Several food products were prepared under the conditions shown in Table 11, and was subjected to sensory evaluation as in Example 1. The results are shown in Table 12.

TABLE 11

| | Food materials | | | Preparation conditions |
|---|---|---|---|---|
| Soft-serve ice cream | Sugar | Commerically available | 25 g | Mixed with stirring in electric soft-serve maker (available from DOSHISHA), frozen at −6° C. |
| | Egg yolk | Commerically available | 20 g | |
| | Fresh cream | Commerically available | 100 mL | |
| | Milk | Commerically available | 40 mL | |
| | Fresh Cream | Commerically available | 200 mL | Mixed with stirring in electric soft-serve maker (available from DOSHISHA), refrigerated at 5° C. |

TABLE 12

|  |  |  | Comparative Sample 23 | Comparative Sample 24 | Comparative Sample 25 | Inventive Sample 23 |
|---|---|---|---|---|---|---|
| Food materials (g) | Soft-serve ice cream (Table 11) | | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 335 | 350 | 335 | 350 |
| | Mechanical property | Rupture stress (Pa) | | Too soft to measure | | |
| | Sensory evaluation | Texture (degree of hardness) | 3 | 3 | 3 | 3 |
| | | Texture (melting properties) | 1 | 1 | 1 | 5 |
| | | Taste (degree of cold stimuli) | 1 | 2 | 2 | 5 |
| | | Taste (degree of persistence) | 1 | 1 | 1 | 5 |
| | | Taste (degree of richness (milkiness, thickness of taste)) | 1 | 1 | 2 | 5 |

TABLE 12-continued

|  |  | Comparative Sample 26 | Comparative Sample 27 | Comparative Sample 28 | Inventive Sample 24 |
|---|---|---|---|---|---|
|  | Comprehensive evaluation of texture and taste | 1 | 2 | 2 | 5 |
|  | Notes | — | — | — | High overrun (retention of air bubbles), remarkably highly whipped |

| | | Comparative Sample 26 | Comparative Sample 27 | Comparative Sample 28 | Inventive Sample 24 |
|---|---|---|---|---|---|
| Food materials (g) | Whipped cream (Table 11) | 185 | 185 | 185 | 185 |
|  | Syrup for immersing nata de coco | 150 | 150 | — | — |
| Hardening agents (g) | Long-chain cellulose — Syrup containing disintegrated nata de coco | — | — | 150 | 150 |
|  | Short-chain cellulose — NP fiber | — | 15 | — | 15 |
| Hardened product | Total amount (g) | 335 | 350 | 335 | 350 |
|  | Sensory evaluation | | | | |
|  | Texture (degree of hardness) | 3 | 3 | 3 | 3 |
|  | Texture (melting properties) | 3 | 3 | 3 | 3 |
|  | Taste (degree of cold stimuli) | 2 | 2 | 3 | 5 |
|  | Taste (degree of persistence) | 2 | 2 | 2 | 5 |
|  | Taste (degree of richness (milkiness, thickness of taste)) | 3 | 3 | 3 | 5 |
|  | Comprehensive evaluation of texture and taste | 3 | 3 | 3 | 5 |
|  | Notes | — | — | — | High overrun (retention of air bubbles), remarkably highly whipped |

The results demonstrate that an increase in hardness was not observed in the soft-serve ice cream and the whipped cream having relatively soft forms because the hardening temperature was relatively high, e.g., about 5° C. to −6° C. and no active hardening operation was employed. In both of the soft-serve ice cream and the whipped cream, a highly whipped state containing a large amount of air bubbles was observed together with other advantageous effects of one or more embodiments of the present invention. This is probably because the dense structure was retained due to the hardening action of the hardening agent to increase the retention (overrun) of fine air bubbles, resulting in a very smooth, fluffy, highly whipped soft texture. Furthermore, the resulting texture probably reduced the contact of ingredients causing sweetness or oiliness derived from the food product with tongue, reducing the persistence in the mouth. For the same reason, a significant increase in surface area of grains of the food product was probably prevented, leading to a light taste in the mouth or a reduction in cold stimuli perceived from the food products containing water cooled by freezing or refrigeration.

[Example 9] Verification of Advantageous Effects of Invention on Food Product Having Intermediate Hardness The advantageous effects of one or more embodiments of the present invention on the food products having relatively hard forms were verified in Example 7, and those on the food products having relatively soft forms were verified in Example 8. The advantageous effects of one or more embodiments of the present invention on the food products having intermediate hardness shown in Table 13 were verified. A variety of food materials were prepared at the mixing ratios in Table 13. Several food products were prepared under conditions shown in Table 13, and was subjected to sensory evaluation as in Example 1. The results are shown in Table 14.

TABLE 13

| Food materials | | | Preparation conditions |
|---|---|---|---|
| Agar jelly | Kanten Cook (available from Ina Food Industry) | 1 g | Added to boiled nata de coca syrup (150 mL), mixed with stirring, hardened by refrigeration |
| Gelatin jelly | Jelli Ace (available from House Foods) | 71 g | Added to nate de coco syrup (150 ml) heated to 70° C., mixed with stirring, hardened by refrigeration |
| Pectin jelly | Fruiche (available from House Foods) | 92.5 g | Added to cold nata de coco syrup (150 mL) and cold milk (92.5 mL), hardened by mixing with stirring |
|  | Milk | 92.5 mL | |
| Konjac gel | Konjac powder | 4.5 g | Added to nata de coco syrup (150 mL), mixed with stirring |
|  | Lime water | 15 mL | Calcium hydroxide (0.150) dissolved in water (15 mL) |
|  | Lime water is added to solution of konjac powder, followed by stirring and shaping. Shaped konjac is hardened in boiling water. | | |

TABLE 14

| | | | Comparative Sample 29 | Comparative Sample 30 | Comparative Sample 31 | Inventive Sample 25 |
|---|---|---|---|---|---|---|
| Food materials (g) | Agat jelly (Table 13) | | 1 | 1 | 1 | 1 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 151 | 166 | 151 | 166 |
| | Mechanical properties | Rupture stress (Pa) | | Too soft to measure | | |
| | | Maximum load (N) | 1.6 | 1.1 | 0.7 | 2.4 |
| | | Maximum stress (Pa) | 53330 | 36670 | 23330 | 80000 |
| | Sensory evaluation | Texture (degree of hardness) | 2 | 3 | 3 | 5 |
| | | Texture (melting properties) | — | — | — | — |
| | | Taste (degree of cold stimuli) | 2 | 2 | 2 | 5 |
| | | Taste (degree of persistence) | 2 | 2 | 2 | 5 |
| | | Taste (degree of richness (milkiness, thickness of taste)) | 2 | 2 | 2 | 5 |
| | | Comprehensive evaluation of texture and taste | 2 | 2 | 2 | 5 |

| | | | Comparative Sample 32 | Comparative Sample 33 | Comparative Sample 34 | Inventive Sample 26 |
|---|---|---|---|---|---|---|
| Food materials (g) | Gelatin jelly (Table 13) | | 71 | 71 | 71 | 71 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 221 | 236 | 221 | 236 |
| | Sensory evaluation | Texture (degree of hardness) | 2 | 3 | 3 | 5 |
| | | Texture (melting properties) | — | — | — | — |
| | | Taste (degree of cold stimuli) | 2 | 2 | 2 | 5 |
| | | Taste (degree of persistence) | 2 | 2 | 2 | 5 |
| | | Taste (degree of richness (milkiness, thickness of taste)) | 2 | 2 | 2 | 5 |
| | | Comprehensive evaluation of texture and taste | 2 | 2 | 2 | 5 |

| | | | Comparative Sample 35 | Comparative Sample 36 | Comparative Sample 37 | Inventive Sample 27 |
|---|---|---|---|---|---|---|
| Food materials (g) | Pectin jelly (Table 13) | | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |
| Hardened product | Total amount (g) | | 335 | 350 | 335 | 350 |
| | Sensory evaluation | Texture (degree of hardness) | 1 | 2 | 3 | 5 |
| | | Texture (melting properties) | — | — | — | — |
| | | Taste (degree of cold stimuli) | 3 | 3 | 3 | 5 |
| | | Taste (degree of persistence) | 1 | 1 | 1 | 5 |
| | | Taste (degree of richness (milkiness, thickness of taste)) | 1 | 1 | 2 | 5 |
| | | Comprehensive evaluation of texture and taste | 1 | 2 | 2 | 5 |

| | | | Comparative Sample 38 | Comparative Sample 39 | Comparative Sample 40 | Inventive Sample 28 |
|---|---|---|---|---|---|---|
| Food materials (g) | Konjac gel (Table 13) | | 185 | 185 | 185 | 185 |
| | Syrup for immersing nata de coco | | 150 | 150 | — | — |
| Hardening agents (g) | Long-chain cellulose | Syrup containing disintegrated nata de coco | — | — | 150 | 150 |
| | Short-chain cellulose | NP fiber | — | 15 | — | 15 |

TABLE 14-continued

| Hardened product | Total amount (g) | | 335 | 350 | 335 | 350 |
|---|---|---|---|---|---|---|
| | Sensory evaluation | Texture (degree of hardness) | 3 | 3 | 4 | 5 |
| | | Texture (melting properties) | — | — | — | — |
| | | Taste (degree of cold stimuli) | — | — | — | — |
| | | Taste (degree of persistence) | 3 | 3 | 3 | 5 |
| | | Taste (degree of richness (milkiness, thickness of taste)) | 3 | 3 | 3 | 5 |
| | | Comprehensive evaluation of texture and taste | 3 | 3 | 3 | 5 |

The results demonstrate that the advantageous effects of one or more embodiments of the present invention were also ensured in the gelatinous food products (agar, gelatin, pectin, and konjac gels) having intermediate hardness between those of the food product having relatively hard forms, such as ice creams, frozen desserts, solid fats, and chocolates and those of the food products having relatively soft forms, such as soft-serve ice creams and whipped cream. Probably, the structure was strengthened due to the advantageous effects of one or more embodiments of the present invention, obstructing disintegration or syneresis of the food products in the mouth; as a result, elution of ingredients causing sweetness or oiliness derived from the food product was reduced, thus reducing the persistence in the mouth. Probably, the elution of ingredients caused by a significant increase in surface area of the food product caused by disintegration or syneresis was prevented, leading to a light taste in the mouth or a reduction in cold stimuli perceived from the food products containing water cooled by freezing or refrigeration.

As described above, one or more embodiments of the present invention provide a structural strengthening agent for a food product that can be achieved by combination in a predetermined ratio of a water-insoluble long-chain cellulose and a water-insoluble short-chain cellulose having predetermined geometries. Adding this structural strengthening agent to food materials and hardening the mixtures can improve a variety of tastes and physical properties of food products.

One or more embodiments of the present invention can avoid dislike of food products such as traditional cold desserts for eating and change the form of eating to contribute to development in the food product industry.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A structure strengthening agent for a food product, comprising:
    a water-insoluble long-chain cellulose having a diameter of 3.5 μm or less and an aspect ratio of 2.0 or more, the water-insoluble long-chain cellulose being a fermented cellulose produced via the fermentation by Acetobacteraceae; and
    a water-insoluble short-chain cellulose having a diameter of 5.0 μm or more and having an aspect ratio of 32.5 or less, the water-insoluble long-chain cellulose and the water-insoluble short-chain cellulose being contained in a mass ratio of 40:60 to 4:96.

2. The structure strengthening agent for a food product according to claim 1,
    wherein a total content of the water-insoluble long-chain cellulose and the water insoluble short-chain cellulose in the food product is 4.5 mass % or more and 53 mass % or less.

3. The structure strengthening agent for a food product according to claim 1,
    wherein the water-insoluble short-chain cellulose is at least one of a pulp cellulose and a dried plant powder.

4. The structure strengthening agent for a food product according to claim 1,
    wherein the food product is hardened from a melted state.

5. The structure strengthening agent for a food product according to claim 4,
    wherein the food product hardened from the melted state is a cold dessert that contains water and is refrigerated at 0° C. or less.

6. The structure strengthening agent for a food product according to claim 5,
    wherein the cold dessert containing water and refrigerated at 0° C. or less is at least one selected from the group consisting of hard ice creams, soft-serve ice creams, and frozen desserts.

7. A food material, comprising the structure strengthening agent for a food product according to claim 1.

8. The food material according to claim 7, further comprising water.

9. The food material according to claim 8,
    wherein the food material contains 2 mass % or more and 98 mass % or less of water.

10. A food product, comprising the food material according to claim 7,
    wherein the food material is hardened under a hardening condition for the food material.

11. A method of producing a food product, comprising:
    mixing the structure strengthening agent for a food product according to claim 1 with a food material; and
    hardening a mixture of the structure strengthening agent for a food product and the food material.

12. The method of producing a food product according to claim 11,
    wherein the food material contains water.

13. The structure strengthening agent for a food product according to claim 1,
    wherein the water-insoluble short-chain cellulose has an average diameter of 8.72 μm or more.

14. The structure strengthening agent for a food product according to claim 1,
    wherein the water-insoluble short-chain cellulose has an average diameter of 14.17 μm or more.

15. The structure strengthening agent for a food product according to claim 1,
    wherein the water-insoluble short-chain cellulose is derived from at least one selected from the group consisting of pulp and corn.

16. The structure strengthening agent for a food product according to claim 1,
   wherein the water-insoluble short-chain cellulose is derived from corn.

17. A method of producing a structure strengthening agent for a food product, comprising the steps of:
   (i) preparing a fermented cellulose produced via the fermentation by Acetobacteraceae;
   (ii) crushing the fermented cellulose from step (i) to produce a water-insoluble long-chain cellulose having a diameter of 3.5 μm or less and an aspect ratio of 2.0 or more; and
   (iii) mixing the water-insoluble long-chain cellulose from step (ii) with a water-insoluble short-chain cellulose having a diameter of 5.0 μm or more and an aspect ratio of 32.5 or less, at a ratio of 40:60 to 4:96 by mass.

18. The method of producing a structure strengthening agent for a food product according to claim 17,
   wherein the water-insoluble short-chain cellulose has an average diameter of 8.72 μm or more and is derived from at least one selected from the group consisting of pulp and corn.

19. A method of producing a food product, comprising the steps of:
   (a) obtaining a structure strengthening agent for a food product by a method according to claim 18;
   (b) adding the structure strengthening agent for a food product from step (a) to a food material to prepare a liquid or paste food mixture; and
   (c) freezing the liquid or paste food mixture from step (b) at a temperature of 0° C. or less to harden the liquid or paste food mixture.

* * * * *